United States Patent
Slaughter (10) Patent No.: US 12,472,044 B1
(45) Date of Patent: Nov. 18, 2025

(54) DENTAL FLOSS THREADER HOLDING APPARATUS

(71) Applicant: Tracey Slaughter, Satellite Beach, FL (US)

(72) Inventor: Tracey Slaughter, Satellite Beach, FL (US)

(*) Notice: Subject to any disclaimer, the term of this patent is extended or adjusted under 35 U.S.C. 154(b) by 0 days.

(21) Appl. No.: 19/044,200

(22) Filed: Feb. 3, 2025

(51) Int. Cl.
*A61C 15/04* (2006.01)
*B65D 25/10* (2006.01)

(52) U.S. Cl.
CPC .......... *A61C 15/045* (2013.01); *B65D 25/108* (2013.01)

(58) Field of Classification Search
CPC .... A61C 15/043; A61C 15/045; B65D 25/108
See application file for complete search history.

(56) References Cited

U.S. PATENT DOCUMENTS

| | | |
|---|---|---|
| 4,191,291 A | 3/1980 | Brown |
| 4,411,363 A | 10/1983 | Walker |
| D325,934 S | 5/1992 | Ramljak |
| 5,112,297 A | 5/1992 | Stalcup |
| 5,769,225 A | 6/1998 | Braude |
| 6,152,147 A * | 11/2000 | Sanchez ................ A61C 15/00 132/324 |
| 7,392,810 B2 | 7/2008 | Apotheker |
| 2005/0133512 A1* | 6/2005 | Prokopp .............. B65D 25/108 220/601 |
| 2010/0139688 A1 | 6/2010 | Musgrave |
| 2016/0213177 A1* | 7/2016 | Maple ................ A47G 19/2227 |
| 2018/0334311 A1 | 11/2018 | Bittner |
| 2020/0054424 A1 | 2/2020 | Hall |
| 2020/0383760 A1* | 12/2020 | Korzhavina ............. B65D 3/24 |
| 2024/0042452 A1* | 2/2024 | Kuitunen ............... B65D 65/10 |

OTHER PUBLICATIONS

Shiloh Roots, LLC, "The Threader Getter" https://www.shilohrootsnc.com/.

* cited by examiner

*Primary Examiner* — Javier A Pagan (74) *Attorney, Agent, or Firm* — Bullock Law; Stephen Bullock (57) ABSTRACT

A dental floss threader holding apparatus including a base with a base first end, a base second end, and top. The base includes medial ribbing on the base exterior and further includes a base platform with threader holders at the base second end. The base is tapered from the base first end to the base second end and the top is structured to removably engage the base platform.

20 Claims, 7 Drawing Sheets

DENTAL FLOSS THREADER HOLDING APPARATUS

FIELD OF THE INVENTION

The present invention relates to dental hygienist tools. In particular, the present invention relates to an apparatus for holding dental floss threaders and making them easily accessible.

BACKGROUND

A dental floss threader is a flexible, loop-shaped tool that helps you floss around dental appliances like braces, bridges, and retainers. It is a flexible piece of plastic used to assist in passing dental floss around fixed bridgework and behind orthodontic wires and under denture retainer bars. Because they are thin pieces of plastic threading, they are often difficult to grasp. Therefore, dental hygienists that may use many of them throughout the day oftentimes find themselves wasting time fishing for the floss threaders.

There exists a need in the art for a tool or apparatus to hold the dental floss threaders in an upright manner to assist with easily accessing them. Therefore, there exists a need in the art for a dental floss threader holding apparatus as claimed and described herein.

SUMMARY OF THE INVENTION

Embodiments of the present invention are related to a dental floss threader holding apparatus including a base with a base first end, a base second end, and top. The base may include medial ribbing on the base exterior and may further include a base platform with threader holders at the base second end. The base may be tapered from the base first end to the base second end and the top may be structured to removably engage the base second end.

In this embodiment, the base second end perimeter may include an upward extending base ridge and the top may include a perimeter tab nominally smaller than the upward extending base ridge structured to friction fit therein atop the base. Additionally, the base may include a wider diameter at the base first end than the diameter at the base second end and the medial ribbing may include at least 8 ribs. Furthermore, the upward extending ridge may include threader holes and the top may be hollow and structured to encapsulate dental floss threaders when engaged with the base.

Some embodiments my include a dental floss threader holding apparatus including a hollow base with a base first end, defined as a base bottom, a base second end, medial ribbing on the base exterior, a base platform with threader holders at the base second end and a top. The top may be structured to removably engage the base second end.

The base bottom may include a removable bottom lid whereby it removably engages the base bottom by at least one of friction fit, threading, and snap fit. The hollow base may be structured to store items therein and the threader holders may be holes arranged in a uniform pattern.

However, in some embodiments the threader holders may be holes arranged in a radial pattern extending from a medial circular pattern. The interior of the medial circular pattern may have evenly disbursed holes.

In other embodiments, the threader holders may include a combination of circular holes and elongate holes. An outer ring of threader holders may be elongated holes structured to splay dental floss threaders outward. This may be accomplished by the outer ring of threader holders including an angled interior wall structured to bias a dental floss threader away from the interior of the base second end. Similarly, in some configurations the threader holders may include a plurality of interior threader holders structured to hold dental floss threaders upright and a plurality of outer threader holders structured to splay dental floss threaders outward.

Another embodiment of the invention may include a dental floss threader holding apparatus with a hollow base including a base first end, defined as a base bottom, a base second end, medial ribbing on the base exterior, a base platform with threader holders at the base second end, and a hollow top. The base may be tapered from the base first end to the base second end and the hollow top may be structured to fit onto the base second end to cover and conceal dental threaders held by the base.

In this embodiment, the base platform may include threader holder holes that are in an evenly disbursed pattern, or a radial pattern, or a pattern consisting of a combination of a plurality of elongate holes surrounding a plurality of circular holes. Additionally, the base bottom may further include a removably engaged lid structured to contain items within the hollow base.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as "above" "below" "upper" "lower" and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as "generally" "substantially" "mostly" and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
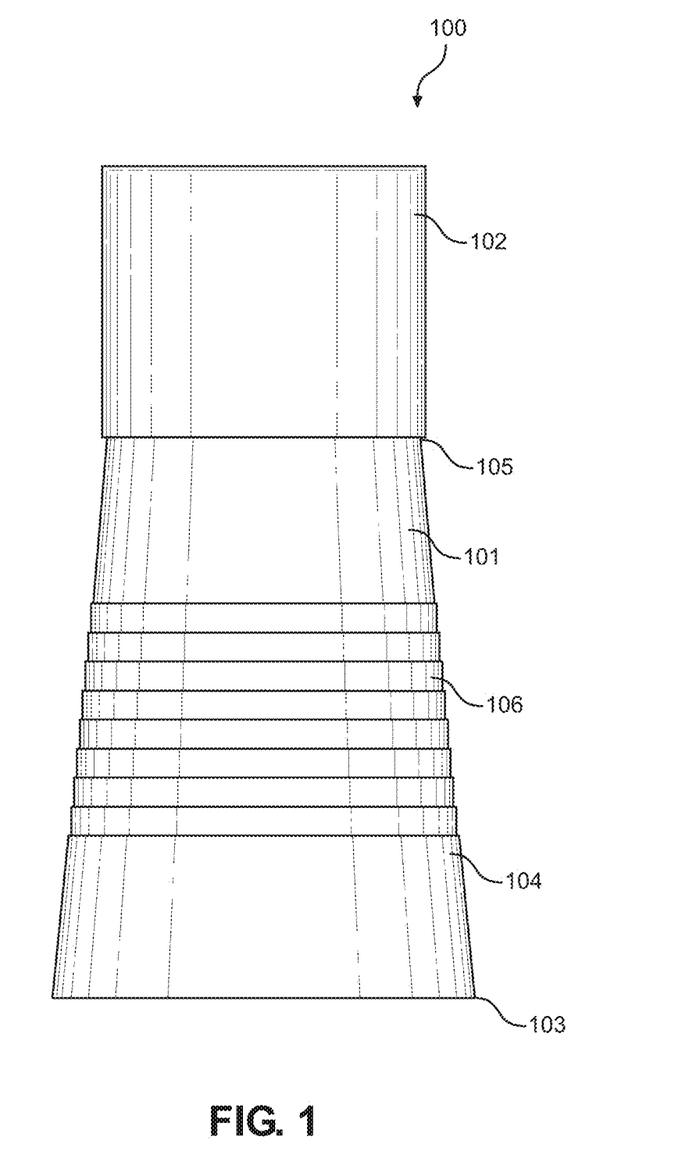
FIG. 1 is a front perspective view of the dental floss threader holding apparatus with a closed top according to an embodiment of the invention.

Referring now to FIG. 1, a dental floss threader holding apparatus, hereinafter the apparatus 100, will be described more fully. The apparatus 100 may be comprised of a base 101 and a top 102. The base may be wider at a first end, also defined as the base bottom 103, and narrower at a base second end 105. Therefore, the base 101 may taper between the base first end 103 and base second end 105. This is because the base 101 may include a wider diameter at the base first end 103 than the diameter at the base second end 105. Additionally, between the base first end 103 and the base second end 105 on its exterior may be medial ribbing 106 designed as a grip to facilitate a user's ability to grasp the apparatus 100. In some embodiments, the medial ribbing 106 may include 8 ribs. However, one skilled in the art will appreciate that there may be more or less ribs depending on preference, need, and circumstance.

Figure 2:
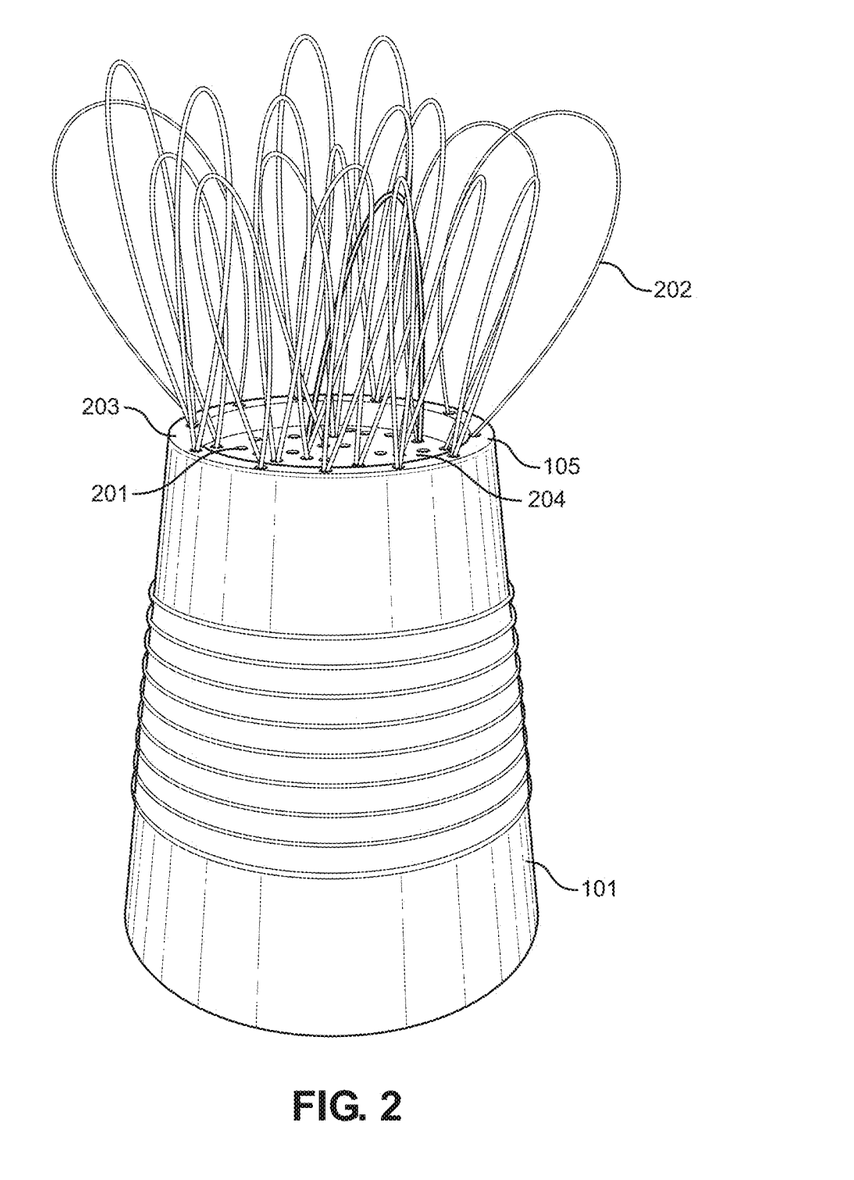
FIG. 2 is a front perspective environmental view of the dental floss threader holding apparatus with top removed and floss threaders inserted according to an embodiment of the invention illustrated in FIG. 1.

FIG. 2 is an environmental view of the base 101 illustrating how it may hold dental floss threaders 202. As shown, the base second end 105 may include threader holders 201, which may be holes permeating through the base second end 105. In some embodiments, the base second end 105 may include a base ridge 203 extending distally, or upward, from a base platform 205, which in some embodiments may be at the perimeter of the second end 105. In some embodiments, the base ridge 203 may also include threader holders or holes 201. In this particular configuration, the floss threaders 202 are shown being held in an upward orientation with respect to the base platform 204.

Figure 3A:
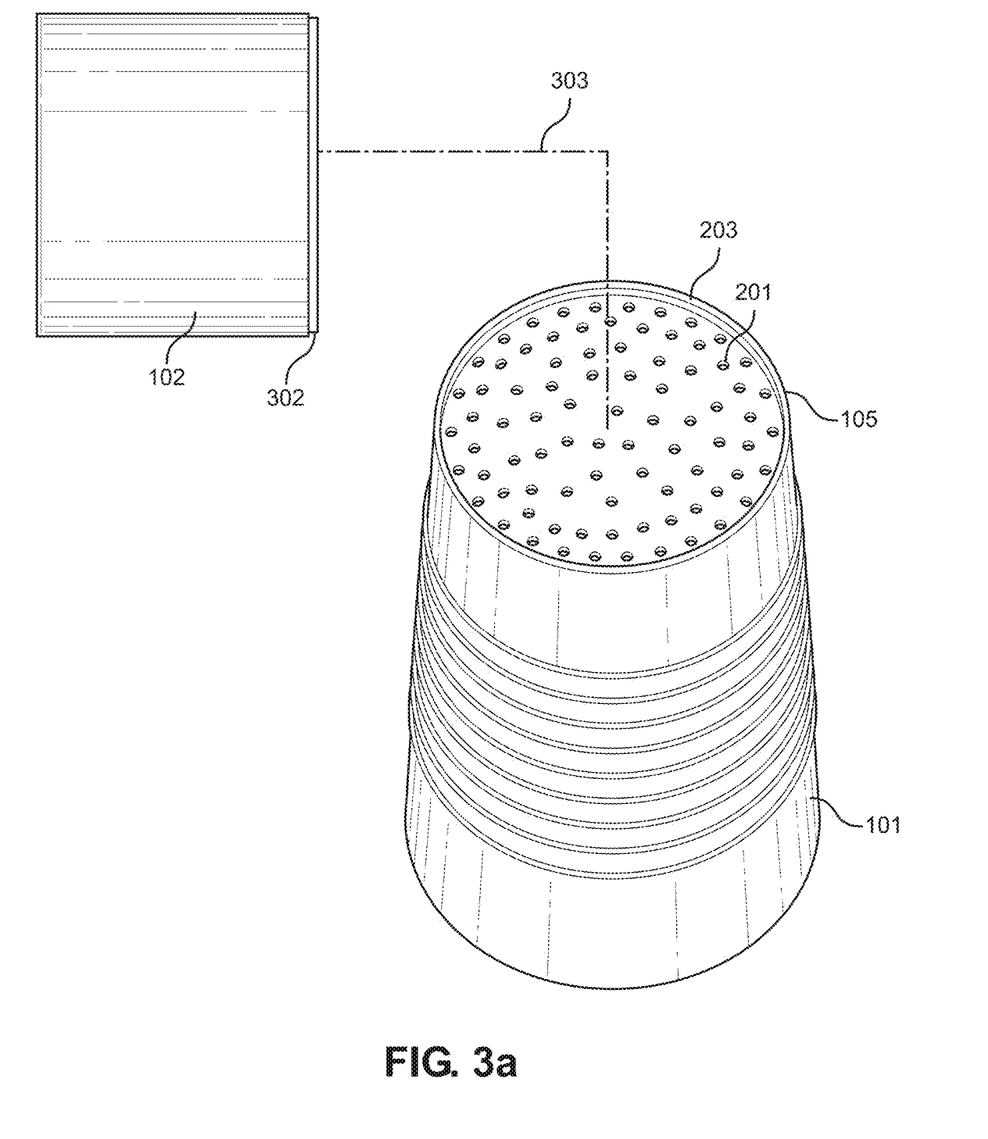
FIG. 3a is a top perspective view of the dental floss threader holding apparatus with top removed according to an embodiment of the invention illustrated in FIG. 1.

FIG. 3a illustrates how the apparatus top 102 may be removably engaged with the base 101. Accordingly, the base second end 105 may include a perimeter comprised of an upward extending base ridge 203. The top 102 may include a perimeter tab 302 nominally smaller than the upward extending base ridge 203 structured to friction fit therein atop the base 101. Therefore, the top 102 may be secured onto or removed from the base 101. Although, contemplated as a friction fit, one skilled in the art will appreciate that the top 102 may be structured to removably engage the base 101 by a variety of means including threading, friction fit, snap fit, and the like.

Figure 3B:
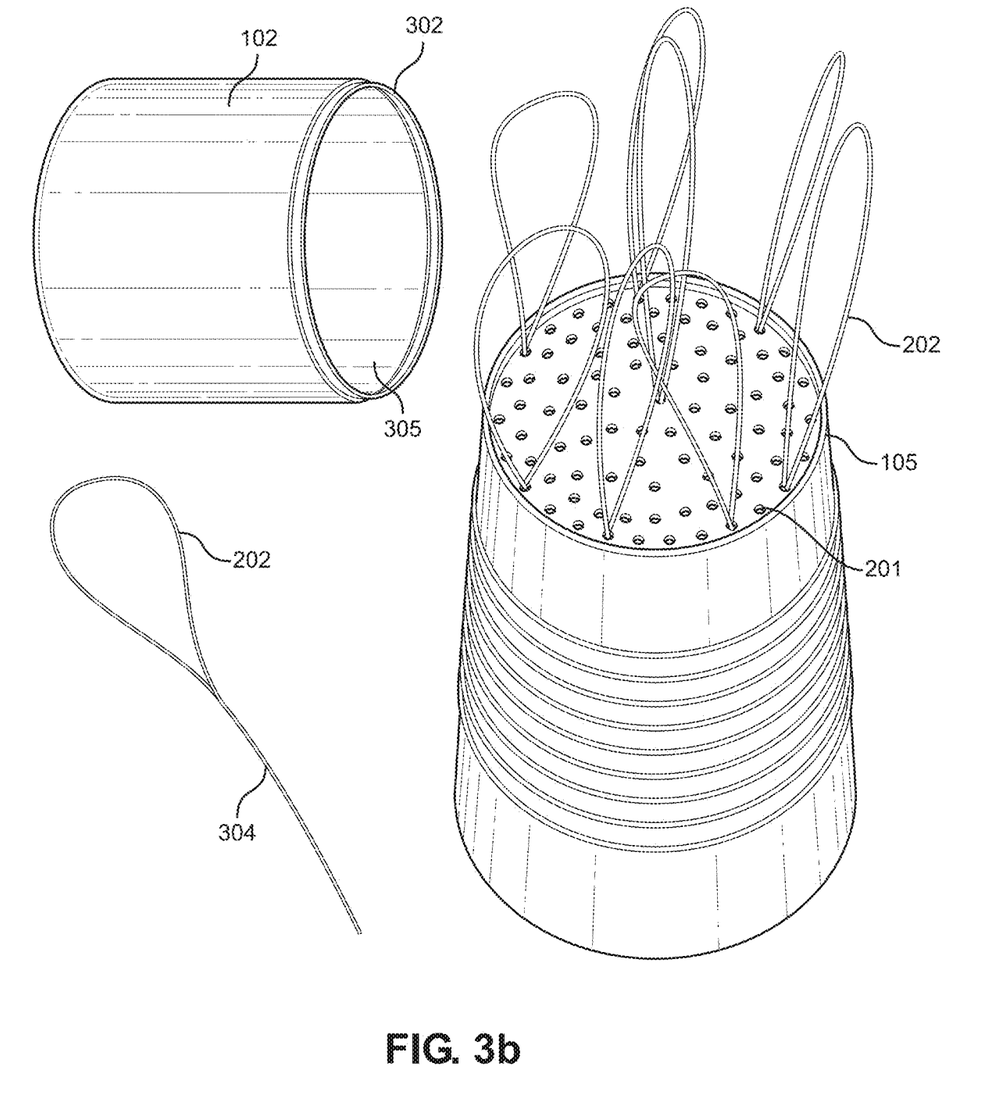
FIG. 3b is a top perspective environmental view of the dental floss threader holding apparatus with top removed, a plurality of floss threaders inserted into the apparatus and a displayed single unheld floss threader according to an embodiment of the invention illustrated in FIG. 1.

FIG. 3b shows an environmental view of the apparatus 100 with the top 102 removed, a plurality of floss threaders 202 inserted into threader holders 201 within the base second end 105, and a single floss threader 202 removed showing it with its stem 304. This view also shows the top tab 302 encircling a hollow interior 305 of the top 102. As shown, the threader holders 201 may receive the stem 304 of the floss threader 202 therethrough and hold it into place while leaving a looped end of the floss threader 202 to be grasped by a user and easily removed from the apparatus 100. The top 102 may be structured with a hollow interior 305 to encapsulate dental floss threaders 202 therein when the top 102 is engaged with the base 101.

Figure 4:
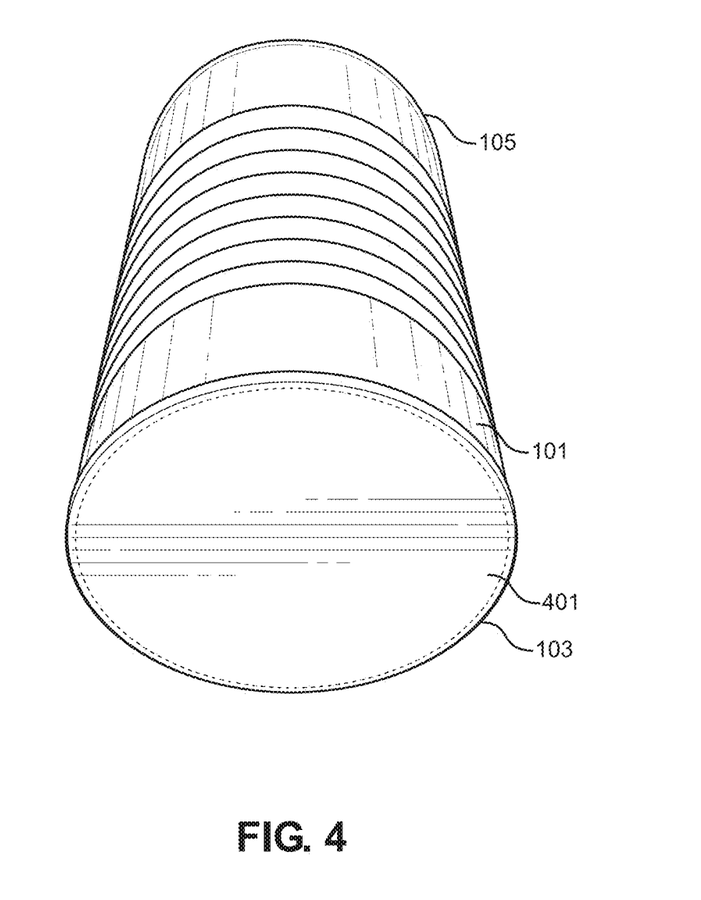
FIG. 4 is a bottom perspective view of the dental floss threader holding apparatus base with base bottom lid according to an embodiment of the invention.
Figure 5:
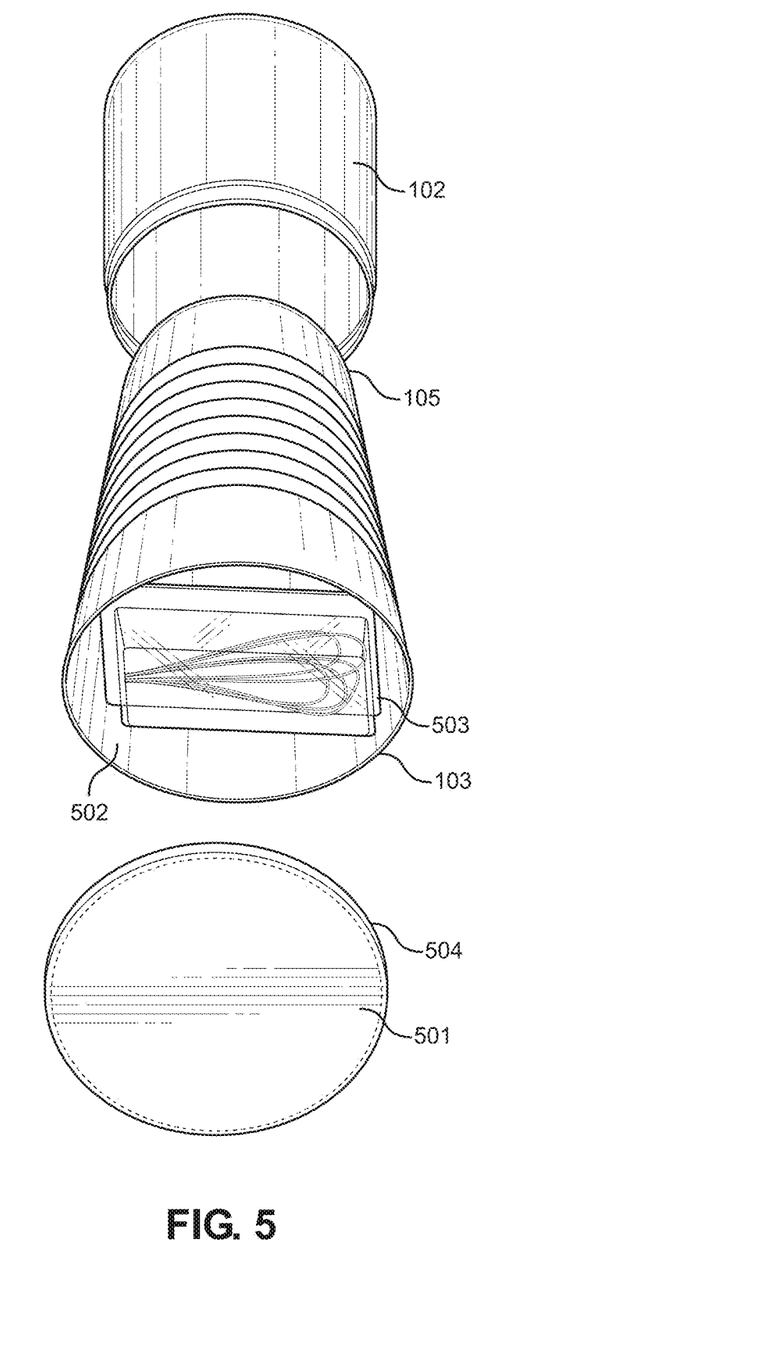
FIG. 5 is an exploded bottom perspective view of the dental floss threader holding apparatus with top removed, stored items, and bottom lid removed.

FIGS. 4 and 5 illustrate additional componentry of the apparatus 100. As shown, the base 101 may include a bottom lid 401 to removably enclose a hollow base interior 502. In FIG. 4 the bottom lid 401 is fully engaged with the base bottom 103. As shown in FIG. 5, the lid is removed from the base bottom 103 exposing contents being stored within the hollow base interior 502. In some embodiments, a user may store extra threader packages 503 or individual floss threaders 202 within the hollow base interior 502 to be used when needed at a later point in time.

In some embodiments, the bottom lid 501 may be fitted into the base bottom 103 via friction fit and in other embodiments it may utilize threading on the base bottom 103 and the bottom lid 501. Furthermore, in this embodiment both the base bottom lid 501 and the base bottom 103 are shown as being circular. However, one skilled in the art will appreciate that the base bottom 103 and the bottom lid 501 may be any shape or size depending on preference, need, and circumstance including square, rectangular, oval, polygonal, and the like.

Figure 6A:
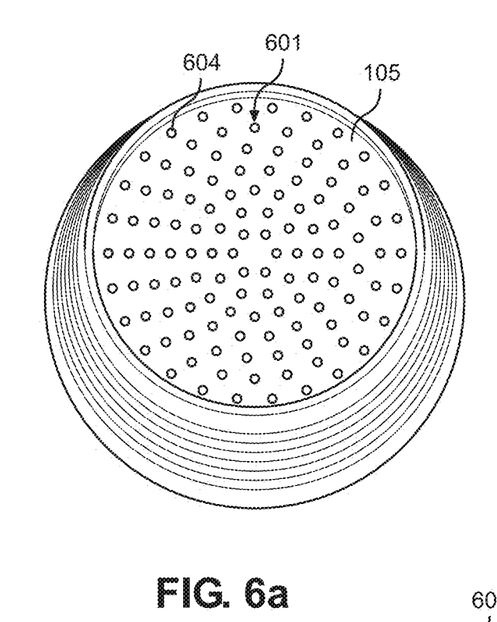
FIG. 6a is a top perspective view of the dental floss threader holding apparatus with a particularly featured hole pattern.
Figure 6B:
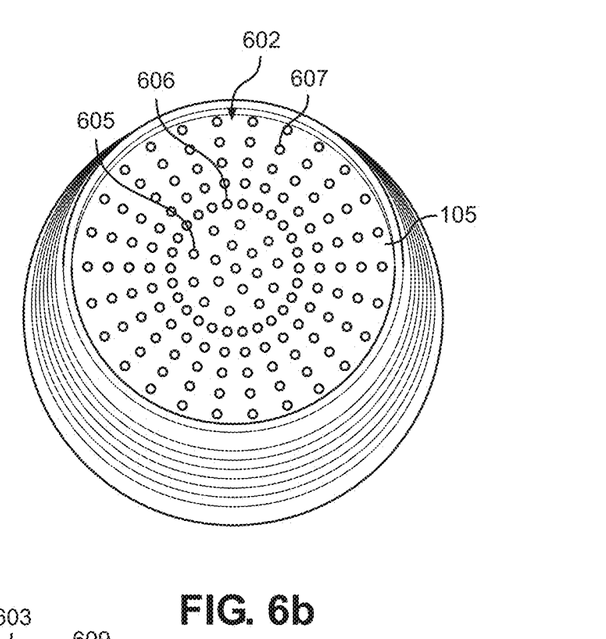
FIG. 6b is a top perspective view of the dental floss threader holding apparatus with a particularly featured hole pattern.
Figure 6C:
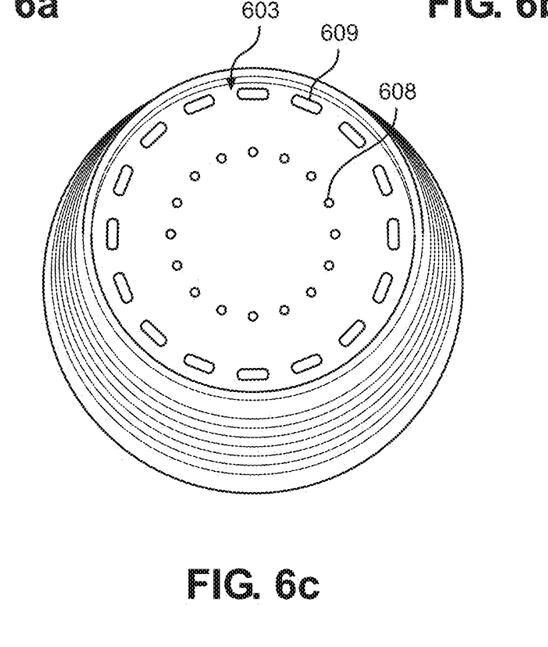
FIG. 6c is a top perspective view of the dental floss threader holding apparatus with a particularly featured hole pattern.

FIGS. 6a, 6b, and 6c illustrate different embodiments showing different configurations of the threader holders 201.

FIG. 6a shows hole pattern "A" 601 whereby the threader holders or holes 201 are structured in an evenly disbursed pattern 604.

FIG. 6b illustrates hole pattern "B" whereby the holes 201 are positioned in a radial pattern 607 whereby a central circle 606 is formed that surrounds evenly disbursed holes in the middle 605. Furthermore, uniform lines are formed by holes 201 extending away from the central circle 606 toward the perimeter of the base 101.

FIG. 6c illustrates hole pattern "C", which is an embodiment of the invention with different types of holes 201 used to orient the floss threaders 202 in different positions. In this embodiment, the threader holders 201 may consist of a plurality of elongate holes 609 surrounding a plurality of circular holes 608. The elongate holes 609 may be structured such that they bias the threader holders 201 to splay the floss threaders 202 outward. In some embodiments, this may be accomplished by the outer ring of elongate holes 609 including an angled interior wall structured to bias a dental floss threader 202 away from the interior of the base second end 105. In hole pattern "C", the interior holes may be structured so that the interior dental floss threaders 202 are positioned upright within circular shaped holes 608 and the exterior surrounding elongate holes 609 position the dental floss threaders 202 in an outwardly splayed orientation.

That which is claimed is:

1. A dental floss threader holding apparatus comprising:
   a base comprising
      a circular base first end and a circular base second end;
      medial ribbing on the base exterior;
      a circular base platform with threader holders at the base second end; and
   a circular top;
   wherein the base comprises a wider diameter at the circular base first end than the diameter at the circular base second end;
   wherein the base is tapered from the base first end to the base second end; and wherein the circular top is configured to removably engage the base second end.

2. The dental floss threader holding apparatus of claim 1 wherein the circular base second end perimeter is comprised of an upward extending base ridge.

3. The dental floss threader holding apparatus of claim 2 wherein the circular top comprises a perimeter tab nominally smaller than the upward extending base ridge configured to friction fit therein atop the base.

4. The dental floss threader holding apparatus of claim 2 wherein the upward extending base ridge comprises threader holes.

5. The dental floss threader holding apparatus of claim 1 wherein the base comprises a wider diameter at the circular base first end than the diameter at the circular base second end.

6. The dental floss threader holding apparatus of claim 1 wherein the medial ribbing includes at least 8 ribs.

7. The dental floss threader holding apparatus of claim 1 wherein the circular top is hollow and configured to encapsulate dental floss threaders therein when engaged with the base.

8. A dental floss threader holding apparatus comprising:
a hollow base comprising
a circular base first end, defined as a circular base bottom, and a circular base second end;
medial ribbing on the base exterior;
a circular base platform with threader holders at the circular base second end; and
a circular top;
wherein the base comprises a wider diameter at the circular base first end than the diameter at the circular base second end;
wherein the circular top is configured to removably engage the circular base second end.

9. The dental floss threader holding apparatus of claim 8 wherein the circular base bottom comprises a removable bottom lid.

10. The dental floss threader holding apparatus of claim 9 wherein the bottom lid removably engages the base bottom by at least one of friction fit, threading, and snap fit.

11. The dental floss threader holding apparatus of claim 8 wherein the hollow base is configured to store items within a hollow base interior.

12. The dental floss threader holding apparatus of claim 8 wherein the threader holders are holes arranged in a uniform pattern.

13. The dental floss threader holding apparatus of claim 8 wherein the threader holders are holes arranged in a radial pattern extending from a medial circular pattern; and wherein the interior of the medial circular pattern comprises evenly disbursed holes.

14. The dental floss threader holding apparatus of claim 8 wherein the threader holders are comprised of a combination of circular holes and elongate holes.

15. The dental floss threader holding apparatus of claim 8 wherein an outer ring of threader holders are elongated holes configured to splay dental floss threaders outward.

16. The dental floss threader holding apparatus of claim 15 wherein the outer ring of threader holders comprise an angled interior wall configured to bias a dental floss threader away from the interior of the circular base second end.

17. The dental floss threader holding apparatus of claim 8 wherein the threader holders include a plurality of interior threader holders configured to hold dental floss threaders upright and a plurality of outer threader holders configured to splay dental floss threaders outward.

18. A dental floss threader holding apparatus comprising:
a hollow base comprising
a circular base first end, defined as a circular base bottom, and a circular base second end;
medial ribbing on the base exterior;
a circular base platform with threader holders at the circular base second end; and
a circular hollow top;
wherein the base comprises a wider diameter at the circular base first end than the diameter at the circular base second end;
wherein the circular base is tapered from the circular base first end to the circular base second end; and
wherein the circular hollow top is configured to fit onto the circular base second end to cover and conceal dental threaders held by the base.

19. The dental floss threader holding apparatus of claim 18 wherein the circular base platform includes threader holder holes that are in an evenly disbursed pattern, or a radial pattern, or a pattern consisting of a combination of a plurality of elongate holes surrounding a plurality of circular holes.

20. The dental floss threader holding apparatus of claim 18 wherein the circular base bottom further includes a removably engaged circular lid configured to contain items within the circular hollow base.

* * * * *